United States Patent [19]
Bryant

[11] 3,762,440
[45] Oct. 2, 1973

[54] METERED WATER FAUCET
[76] Inventor: Robert Bryant, 8111 Golden's Forest, San Antonio, Tex. 78239
[22] Filed: Dec. 21, 1971
[21] Appl. No.: 210,317

[52] U.S. Cl. .................. 137/551, 73/229
[51] Int. Cl. ............ F16k 37/00, G01f 3/00
[58] Field of Search ............... 73/229; 222/32; 285/8; 248/206 A; 137/551

[56] References Cited
UNITED STATES PATENTS

| | | | |
|---|---|---|---|
| 1,152,952 | 9/1915 | Kepka | 73/229 |
| 1,177,529 | 3/1916 | Marquardt | 137/551 X |
| 1,304,607 | 5/1919 | Schorik | 73/229 |
| 1,963,330 | 6/1934 | Lumme | 73/229 |
| 2,696,389 | 12/1954 | Cessford | 248/206 A X |
| 2,799,866 | 7/1957 | Jawett | 285/8 X |
| 2,875,452 | 3/1959 | Portolano | 285/8 X |
| 2,972,878 | 2/1961 | Dickey | 285/8 X |

*Primary Examiner*—Henry T. Klinksiek
*Attorney*—Howard I. Podell

[57] ABSTRACT

A water faucet adaptable for use in a kitchen sink, with meter means to measure the water flow, together with digital indicating means to indicate the volume of the total flow, and a reset mechanism to set the indicator to the zero start position. An alternate embodiment of the invention is an attachable unit containing the meter and the indicating means, said unit being adaptable to be clamped on the orifice of a conventional faucet.

1 Claim, 4 Drawing Figures

PATENTED OCT 2 1973

3,762,440

INVENTOR.
ROBERT D. BRYANT
BY Howard I. Podell
AGENT

METERED WATER FAUCET

SUMMARY OF THE INVENTION

This invention relates to a mechanism for indicating the volume of water flowing through a kitchen type faucet, so as to eliminate the need for measuring containers.

The device may be built into a sink mounted faucet, or furnished as an attachment to a conventional faucet orifice.

The unit includes a metered measuring device which operates a digital indicator to read out the volume of water flow, together with a reset mechanism to set the indicating device to the zero start position.

DESCRIPTION OF THE DRAWING

The objects and features of the invention may be understood with reference to the following detailed description of an illustrative embodiment of the invention taken together with the accompanying drawing in which.

DESCRIPTION OF THE PREFERRED EMBODIMENT

Figure 1:
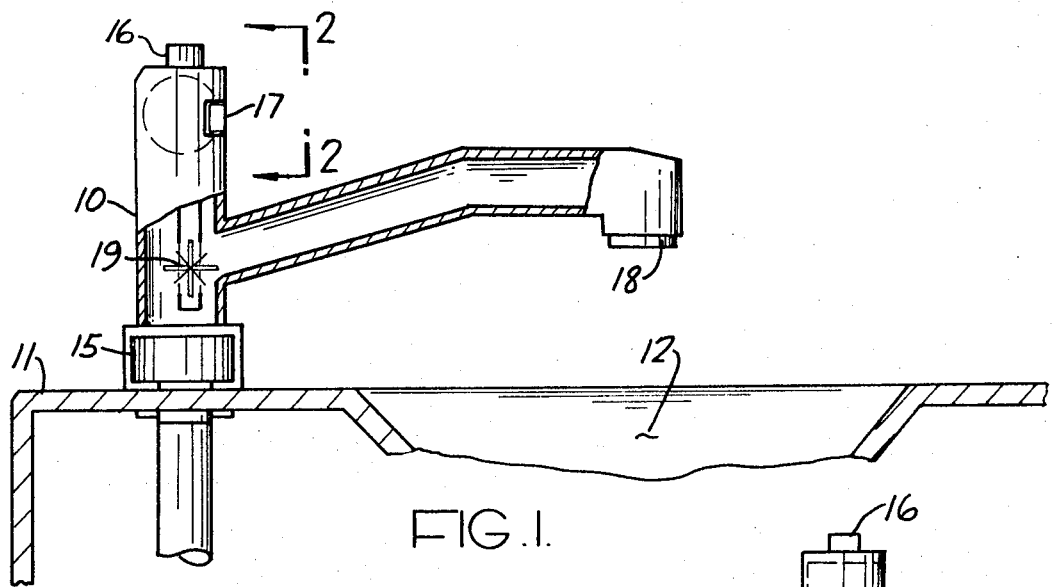
FIG. 1 is a cross-section elevation view of the device incorporated in a kitchen sink faucet.
Figure 2:
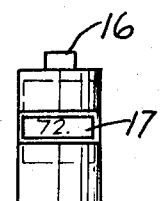
FIG. 2 is a front view of the indicator and reset mechanism of the device taken at line 2—2 of FIG. 1.

Turning now descriptively to the drawing in which similar reference characters denote similar elements throughout the several views, FIG. 1 illustrates a faucet 10 mounted on a counter top 11 adjacent the sink 12. The faucet 10 is controlled by a conventional flow valve knob 15. Water flowing through the faucet and out of faucet orifice 18 rotates measuring wheel 19 which is geared to digital indicator 17. As shown in FIG. 1 and FIG. 2, reset button 16 sets the indicator 17 to the zero start position.

Figure 3:
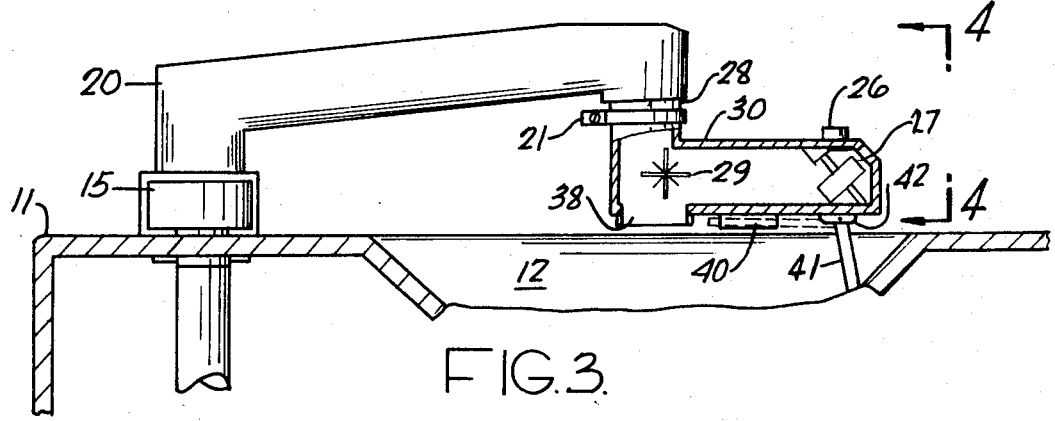
FIG. 3 is a cross-section elevation view of an alternate embodiment of the device attached to a conventional kitchen sink faucet.
Figure 4:
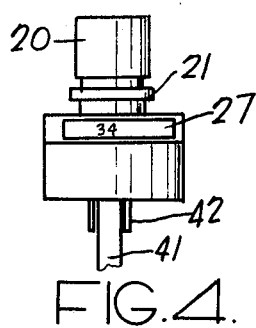
FIG. 4 is a front view of the indicator and reset mechanism of the alternate embodiment taken at line 4—4 of FIG. 3.

Referring to FIG. 3 and FIG. 4, the metering and indicating unit may be in the form of an attachment unit 30 which is fastened about the mouth 28 of conventional faucet 20 by means of clamp 21. Faucet 20 is mounted on a counter top 11 adjacent to sink 12 and controlled by flow valve knob 15. Water flowing from the faucet through the attachment unit 30, and out of attachment orifice 38, rotates metering wheel 29 which is geared to indicator 27. Button 26 resets the indicator 27 to the zero start position. The added weight of attachment unit 30 may be supported by pivotable brace 41. Brace 41 may be folded and fastened to the attachment device 30 when not in use, by snapping into clip 40 mounted on the device. Brace 41 may be of adjustable length, and may terminate in a suction cup magnet, or other means of gripping the supporting surface of the sink 12.

Indicator 17 may set to read digitally in fractions of a pint, quarts and gallons, or may be geared in terms of other units of volume, required in the preparation of foodstuffs, kitchen cleaning compounds, etc.

Since obvious changes may be made in the specific embodiment of the invention described herein without departing from the scope thereof, it is indicated that all matter contained herein is intended to be interpreted in an illustrative sense and not a limiting sense.

Having thus described my invention, what I claim as new and desire to secure by Letters Patent of the United States is:

1. A water faucet unit adaptable for use in a kitchen sink which incorporates meter means to measure the volume of water flowing through the faucet, together with digital indicating means to display the measured volume, said indicating means being equipped with a reset operator to set the indicator to the zero position, in which the metering means, indicating means, and reset operator are incorporated in a unit which attaches by clamping means to the mouth of a conventional faucet, with auxilliary supporting means for bracing the weight of the attachment unit pivotably mounted to the attachment unit, said auxilliary supporting means comprising a shaft of adjustable length.

* * * * *